(12) United States Patent
Hattori et al.

(10) Patent No.: US 9,735,644 B2
(45) Date of Patent: Aug. 15, 2017

(54) INVERTER-INTEGRATED ELECTRIC COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Tokyo (JP); Masahiko Asai, Tokyo (JP); Hiroyuki Kamitani, Tokyo (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 285 days.

(21) Appl. No.: 14/440,160

(22) PCT Filed: Oct. 7, 2013

(86) PCT No.: PCT/JP2013/077237
§ 371 (c)(1),
(2) Date: May 1, 2015

(87) PCT Pub. No.: WO2014/091815
PCT Pub. Date: Jun. 19, 2014

(65) Prior Publication Data
US 2015/0295467 A1 Oct. 15, 2015

(30) Foreign Application Priority Data

Dec. 11, 2012 (JP) .................................. 2012-270617

(51) Int. Cl.
*H02K 11/00* (2016.01)
*H02K 9/00* (2006.01)
(Continued)

(52) U.S. Cl.
CPC ............. *H02K 5/225* (2013.01); *F01C 21/10* (2013.01); *F04B 39/00* (2013.01); *F04B 39/121* (2013.01);
(Continued)

(58) Field of Classification Search
CPC .............................. H02K 11/00; F04B 39/12
(Continued)

(56) References Cited

U.S. PATENT DOCUMENTS

2004/0145860 A1* 7/2004 Shindo ................ B60R 16/0239
361/622
2010/0018243 A1* 1/2010 Tanaka .................. F04B 39/121
62/508
(Continued)

FOREIGN PATENT DOCUMENTS

| CN | 1854520 A | 11/2006 |
|---|---|---|
| CN | 101187364 A | 5/2008 |

(Continued)

OTHER PUBLICATIONS

Chinese Office Action issued in the corresponding Chinese Patent Application No. 201380058091.8, mailed on Apr. 5, 2016, including English Translations thereof.

(Continued)

*Primary Examiner* — Jose Gonzalez Quinones
(74) *Attorney, Agent, or Firm* — Birch, Stewart, Kolasch & Birch, LLP (57) ABSTRACT

The purpose of the present invention is to provide an inverter-integrated electric compressor in which a DC power input system is simplified as a configuration for directly connecting a power source cable connector to a P-N terminal on a substrate, stress caused to the substrate can be reduced even in this case, and damage to the substrate and mounting components can be prevented. In the inverter-integrated (Continued)

electric compressor, a P-N terminal for inputting high-voltage DC power is provided on a main substrate of an inverter device, a power source cable can be connected by inserting a connector into the P-N terminal, the connector being provided to one end the terminal, an electrical component constituting the inverter device is placed on the opposite side of the P-N terminal to sandwich the main substrate therebetween, and the stress caused to the main substrate when the connector is inserted is borne by the electrical component.

7 Claims, 4 Drawing Sheets (51) Int. Cl.
*H02M 7/48* (2007.01)
*F04B 39/12* (2006.01)
*H02K 5/22* (2006.01)
*F01C 21/10* (2006.01)
*F04B 39/00* (2006.01)
*H02K 11/02* (2016.01)
*H02K 11/33* (2016.01)

(52) U.S. Cl.
CPC .............. *H02K 11/02* (2013.01); *H02K 11/33* (2016.01); *F04C 2240/803* (2013.01); *F04C 2240/808* (2013.01)

(58) Field of Classification Search
USPC ................ 310/52, 64, 71; 363/132; 417/415
See application file for complete search history.

(56) References Cited

U.S. PATENT DOCUMENTS

| 2010/0303648 | A1 | 12/2010 | Watanabe et al. |
| 2010/0320880 | A1* | 12/2010 | Kamogi ................. H02K 11/33 310/68 B |
| 2011/0163705 | A1* | 7/2011 | Sato .................... H02K 11/0073 318/400.24 |
| 2011/0236235 | A1 | 9/2011 | Hattori et al. |
| 2012/0237376 | A1 | 9/2012 | Kinoshita et al. |
| 2013/0033914 | A1* | 2/2013 | Yahata ................... H02M 7/48 363/132 |

FOREIGN PATENT DOCUMENTS

| CN | 102144534 A | 8/2011 |
| EP | 1 034 983 A2 | 9/2000 |
| EP | 1363025 A2 | 11/2003 |
| EP | 2233741 A1 | 11/2011 |
| JP | 11-135965 A | 5/1999 |
| JP | 2000-261160 A | 9/2000 |
| JP | 2009-275606 A | 11/2009 |
| JP | 2010163957 A | 7/2010 |
| JP | 2010-209685 A | 9/2010 |
| JP | 2011220308 A | 11/2011 |
| JP | 2011236858 A | 11/2011 |
| JP | 2012-193660 A | 10/2012 |
| JP | 2012-209414 A | 10/2012 |

OTHER PUBLICATIONS

Decision to Grant a Patent issued on Sep. 6, 2016 in Japanese Patent Application No. 2012-270617 with an English Translation.
Notice of Granting a Patent Right for Invention issued on Sep. 5, 2016 in corresponding Chinese Patent Application No. 20138005809.8 with an English Translation.

* cited by examiner

INVERTER-INTEGRATED ELECTRIC COMPRESSOR

TECHNICAL FIELD

The present invention relates to an inverter-integrated electric compressor in which an inverter device is integrally incorporated into the housing of the electric compressor.

BACKGROUND ART

Inverter-integrated electric compressors in which an inverter device is integrally incorporated are used as air conditioner compressors installed in electric vehicles, hybrid vehicles, or the like. The inverter-integrated electric compressor is configured to be driven by converting high-voltage DC power supplied from a power supply unit installed in the vehicle into three-phase AC power of a specified frequency, and applying the converted power to the electric motor.

An inverter device is configured from, for example, high-voltage system components, such as inductor coils and smoothing capacitors, which constitute a noise cancelling filter circuit provided in a high-voltage line from a power source, a sub substrate, on which is mounted a switching circuit including a plurality of switching elements (power elements), such as IGBT that convert DC power to three-phase AC power, a main substrate (printed circuit board), on which is mounted a control circuit that operates at a low voltage, such as a CPU, and a busbar or the like that interconnects these high-voltage system components, sub substrate, and main substrate, converts the DC power input via a P-N terminal into three-phase AC power, and outputs the converted power from UWV terminals.

A power source cable which supplies DC power from a power source to the inverter device configures a filter circuit by connecting a power source cable connector to a connector connection portion provided on the inverter housing portion side, and connecting an inductor coil, smoothing capacitor, and the like by means of a terminal block or busbar to the DC power line from the connector, and is connected to a P-N terminal provided on the substrate side, for example, as described in Patent Document 1.

Additionally, Patent Document 2 discloses a technology in which a power input port formation portion is formed in a metallic inverter cover, which seals an inverter housing space, in which a circuit board is installed, on which filter coils and capacitors are mounted, and a resin power source connector is integrally provided by resin insert molding metal terminals into this port formation portion, wherein the power source cable is connected to this power source connector and the metal terminals of the resin power source connector and the circuit board are connected by securing the inverter cover to the housing.

CITATION LISTS

Patent Documents

Patent Document 1: Japanese Unexamined Patent Application Publication No. 2009-275606A
Patent Document 2: Japanese Unexamined Patent Application Publication No. 2012-193660A

SUMMARY OF THE INVENTION

Technical Problem

However, the technology described in the above Patent Document 1 requires that a terminal block or busbar is provided in a DC power input system from the power source cable to connect the high-voltage system components for constituting a filter circuit, such as coils and capacitors. Therefore, there were problems in that the inverter device had a more complex configuration and the cost and size thereof were increased due to the increased number of components, while it was more difficult to ensure the reliability thereof due to the increased number of connection portions via the busbar.

Meanwhile, the technology described in Patent Document 2 is able to simplify the configuration of the DC power input system since the coils and capacitors may be mounted on a substrate, an integrated resin power source connector may be integrally provided that connects the power source cable to the inverter cover, and metal terminals in this connector may be connected to the circuit board when mounting the inverter cover. However, there were problematic cases in which excess pressing force was caused to the circuit board when the terminals were inserted when connecting the metal terminals to the circuit board, and there was a risk that this stress would damage the circuit board or damage the mounting components.

In light of these circumstances, an object of the present invention is to provide an inverter-integrated electric compressor in which a DC power input system is simplified as a configuration for directly connecting a power source cable connector to a P-N terminal on a main substrate, stress caused to the substrate can be reduced in this case, and damage to the substrate and mounting components can be prevented.

Solution to Problem

The inverter-integrated electric compressor of the present invention employs the following means to solve the above problems.

Namely, the inverter-integrated electric compressor according to an aspect of the present invention is an inverter-integrated electric compressor in which an inverter device is integrally incorporated into an inverter housing portion provided on the outer periphery of a housing, wherein a P-N terminal for inputting high-voltage DC power is provided on a main substrate of the inverter device and a power source cable can be connected by inserting a connector into the P-N terminal, the connector being provided to one end of the terminal, and an electrical component constituting the inverter device is placed on the opposite side of the P-N terminal to sandwich the main substrate therebetween, and the stress caused to the main substrate when the connector is inserted is borne by the electrical component.

Since, according to the present invention, a P-N terminal for inputting high-voltage DC power is provided on a main substrate of an inverter device and a power source cable can be connected by inserting a connector provided into the P-N terminal, the connector being provided to one end of the terminal, and an electrical component constituting the inverter device is placed on the opposite side of the P-N terminal to sandwich the main substrate therebetween, and the stress caused to the main substrate when the connector is inserted is borne by the electrical components, stress caused to the main substrate when the connector is inserted can be reduced by being borne by the electrical component that is placed on the opposite side of the P-N terminal to sandwich the main substrate. Consequently, damage to the main substrate and the mounting components due to the stress by the excessive pressing force caused when inserting the connector can be reliably eliminated. Additionally, omitting a terminal block or busbar provided in the DC power input system to reduce the number of components of the inverter device can simplify the configuration, reduce cost, and reduce size and weight, while decreasing the connections made via busbar can reduce the number of fabrication steps and improve reliability.

Furthermore, in the above inverter-integrated electric compressor, the connector provided to one end of the power source cable is provided at a position corresponding to the P-N terminal on the side of the cover that seals the inverter housing portion, whereby it can be inserted into the P-N terminal when the cover is installed.

Since, according to the present invention, the connector provided to one end of the power source cable is provided at a position corresponding to the P-N terminal on the side of the cover that seals the inverter housing portion, whereby it can be inserted into the P-N terminal when the cover is installed, the power source cable can be connected to the P-N terminal in the inverter device by inserting the connector disposed on the inner face of the cover into the P-N terminal at the same time as when the cover is installed to seal the inverter housing portion. Consequently, the connection structure of the power source cable can be simplified and the connecting process therefor can be simplified, and the connector can be reliably inserted into the P-N terminal without causing excessive stress to the main substrate, even if the connector is engaged by pressing the cover with a certain degree of excess force.

Furthermore, in any of the inverter-integrated electric compressors described above, the electrical component includes a support portion that supports the main substrate on the opposite surface side of the main substrate, and is placed on the rear surface side of the main substrate corresponding to the position at which the P-N terminal is disposed.

According to the present invention, since the electrical component includes a support portion that supports the main substrate on the opposite surface side of the main substrate, and is placed on the rear surface side of the main substrate corresponding to the position at which the P-N terminal is disposed, stress caused to the main substrate when the connector is inserted into the P-N terminal can be supported by the facing support portion of the electrical component placed on the rear surface side thereof. Consequently, stress caused to the main substrate can be vastly reduced and damage to the main substrate or damage to the mounting components can be reliably prevented.

Furthermore, in any of the inverter-integrated electric compressors described above, the electrical components are smoothing capacitors that constitute a noise cancelling filter circuit provided in the high-voltage DC power line of the inverter device.

According to the present invention, since the electrical components are smoothing capacitors that constitute a noise cancelling filter circuit provided in the high-voltage DC power line of the inverter device, the electrical components can be utilized as they are to bear stress caused to the main substrate by placing smoothing capacitors, which is housed inside the case and have a rectangular outside shape, on the opposite side of the P-N terminal to sandwich the main substrate. Consequently, by devising the disposition of existing electrical components to effectively use them as members to bear stress caused to the main substrate, it becomes possible to employ a configuration in which the power source cable is directly connected to the P-N terminal on the main substrate, which can reduce the number of components in the inverter device, reduce costs, and reduce size and weight.

Advantageous Effects of Invention

The present invention can reduce the stress caused to the main substrate when inserting a connector by bearing that stress with the electrical components placed on the opposite side of the P-N terminal to sandwich the main substrate therebetween, even with a configuration in which the power source cable is directly connected to the P-N terminal provided on the main substrate by inserting the connector provided to one end of the power source cable. Therefore, the damage to the main substrate and the mounting components due to the stress by the excessive pressing force caused when inserting the connector can be prevented. Additionally, omitting a terminal block or busbar provided in the DC power input system to reduce the number of components in the inverter device can simplify the configuration, reduce cost, and reduce size and weight. Also, reducing the number of the connections made via busbar can reduce the number of fabrication steps and improve reliability.

DESCRIPTION OF EMBODIMENTS

An embodiment of the present invention will be described below, referring to FIG. 1 to FIG. 4.

Figure 1:
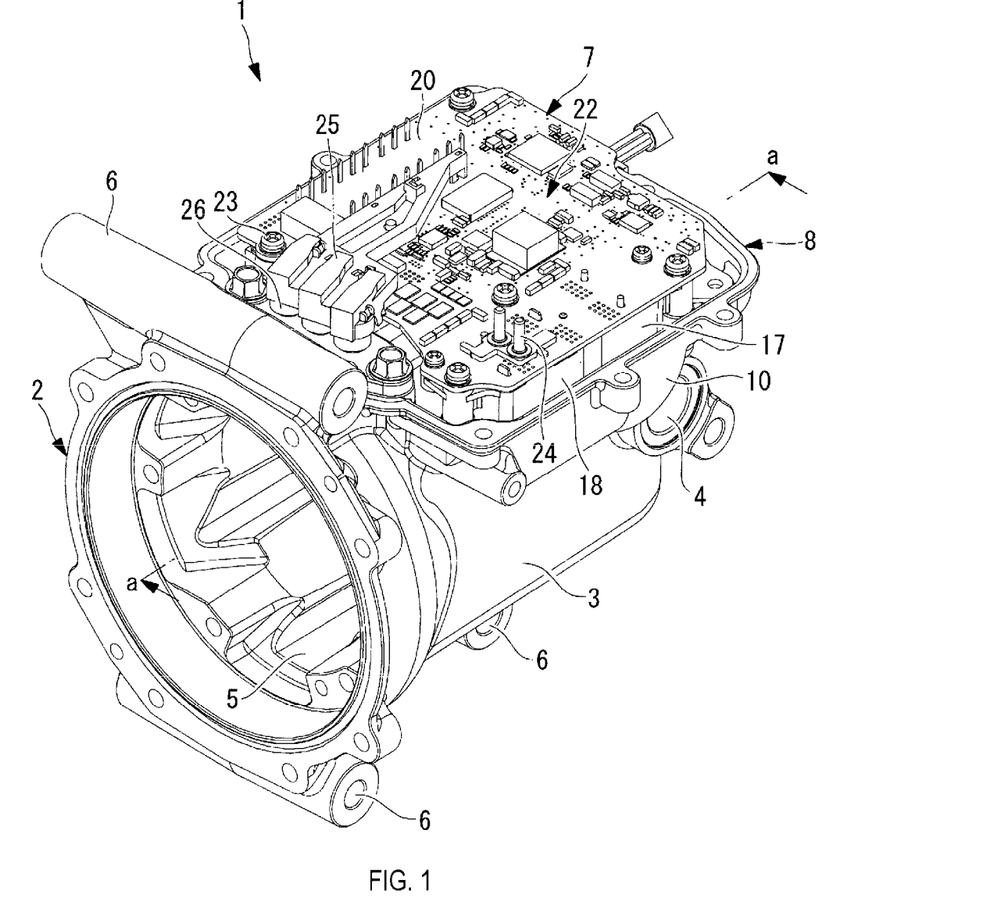
FIG. 1 is a perspective view illustrating a configuration of main components of an inverter-integrated electric compressor according to an embodiment of the present invention.
Figure 2:
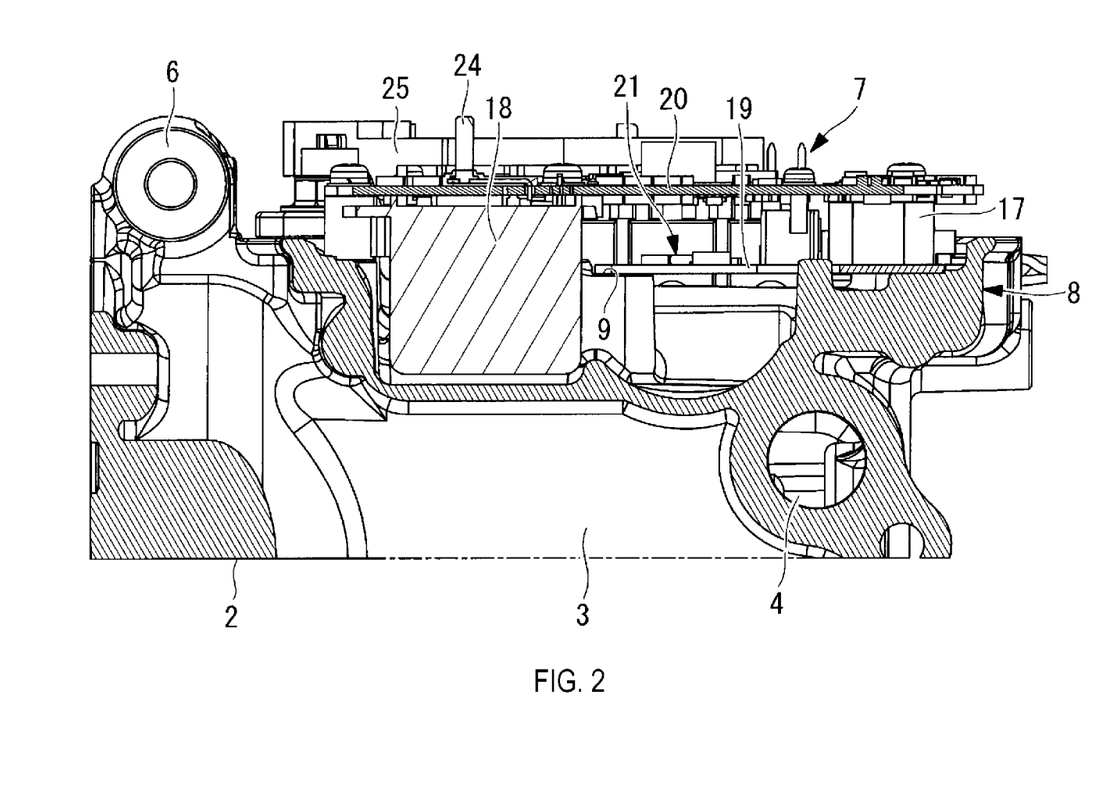
FIG. 2 is a corresponding longitudinal cross-sectional view along the line a-a in FIG. 1.
Figure 3:
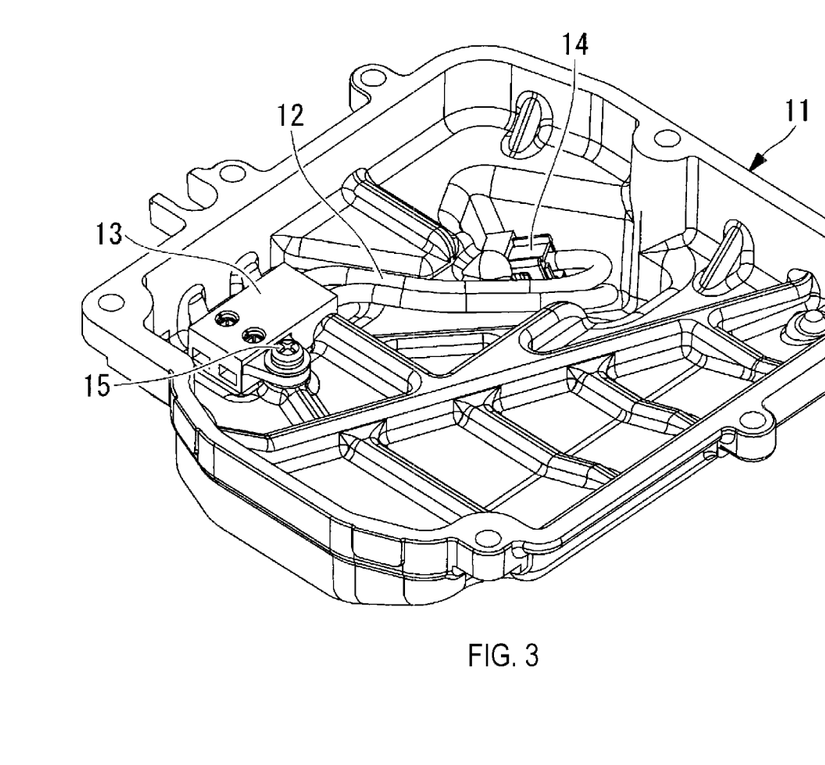
FIG. 3 is a perspective view of a rear surface side of a cover that seals an inverter housing portion of the inverter-integrated electric compressor depicted in FIG. 1.
Figure 4:
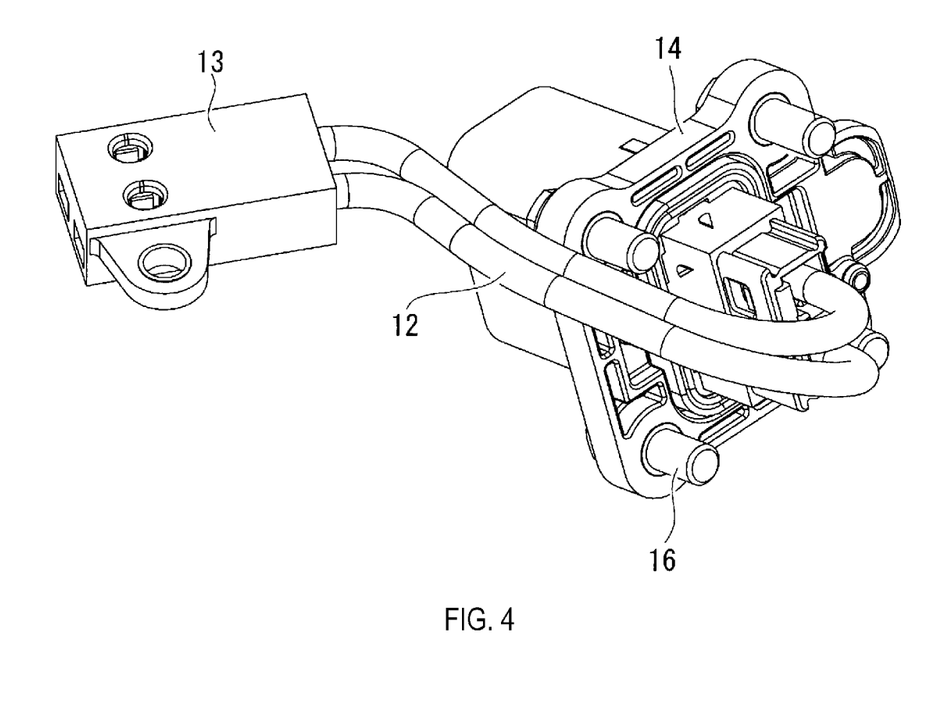
FIG. 4 is a perspective view of a power source cable single unit connected to the cover depicted in FIG. 3.

FIG. 1 is a perspective view illustrating main components of an inverter-integrated electric compressor according to an embodiment of the present invention. FIG. 2 is a corresponding longitudinal cross-sectional view along the line a-a in FIG. 1. FIG. 3 is a perspective view of a rear surface side of a cover that seals an inverter housing portion. FIG. 4 is a perspective view of a power source cable single unit.

The inverter-integrated electric compressor 1 includes a cylindrical shaped housing 2 that constitutes an outer shell. The housing 2 is configured from a motor housing 3 for installing an electric motor (not illustrated), and a compressor housing (not illustrated) for installing a compressor mechanism (not illustrated), which are linked into a single unit.

The inverter-integrated electric compressor 1 is configured such that an electric motor and a compressor mechanism built into the housing 2 are linked by means of a rotary shaft, and the compressor mechanism is driven by rotationally driving the electric motor by means of an inverter device 7 discussed below, a low-pressure coolant gas drawn into the interior of the motor housing 3 via an intake port 4 disposed in the rear end side surface thereof is drawn in via the periphery of the electric motor, compressed to a high pressure by the compressor mechanism, and discharged inside the compressor housing, and then sent outside.

A plurality of coolant flow paths 5 is formed in the motor housing 3 to allow coolant to flow along an axial direction of the inner circumferential surface side, and legs 6 for mounting the inverter-integrated electric compressor 1 are provided at a plurality of locations around the outer circumferential portion thereof. An inverter housing portion 8 is also integrally formed in the outer circumferential portion of the housing 2 (on the motor housing 3 side) for integrally incorporating the inverter device 7. The inverter housing portion 8 has a roughly square shape in a plan view, and is configured such that the bottom surface thereof is a partially and roughly flat pedestal face 9 formed from wall faces of the motor housing 3, and a flange portion 10 extends up at the periphery thereof.

The inverter housing portion 8 is also configured to be sealed by installing a cover 11 on the flange 10, as illustrated in FIG. 3, after the inverter device 7 has been incorporated. A high-voltage cable (power source cable) 12 is provided on the inner surface side of the cover 11. The high-voltage cable 12 is provided with a connector 13 at one end thereof, and is provided with a connector terminal 14 at the other end thereof that is connected with the power source cable. The connector 13 on one end is disposed secured by a screw 15 to the inner surface of the cover 11 at a position corresponding to a P-N terminal 24 provided on the main substrate 20, described below. The connector 14 on the other end is disposed secured by a plurality of screws 16 to the outer surface of the cover 11 in a state with the terminal portion protruding from the outer surface side of the cover 11.

The high-voltage cable 12 constitutes a portion of the power source cable. High-voltage DC power supplied from the power source unit is applied to the inverter device 7 by connecting the high-voltage cable 12 to the power supply unit installed in the vehicle by means of a power cable, and connecting the connector 13 provided to one end thereof to the P-N terminal 24 provided on the main substrate 20 of the inverter device 7.

The inverter device 7 drives the electric motor by converting high-voltage DC power supplied from the power supply unit installed in the vehicle into three-phase AC power of a specified frequency, and then applying the same to the electric motor. The inverter device 7 is integrally incorporated into the inverter housing portion 8, as illustrated in FIG. 1 and FIG. 2, and is configured from a plurality of high-voltage system components, such as an encased coil 17 and a smoothing capacitor 18, that constitute a filter circuit, a sub substrate 19, a main substrate 20, and the like.

The inverter device 7 itself may be one that is publicly known, but for the sake of integration, a device in which the plurality of high-voltage system components, such as an encased coil 17 and a smoothing capacitor 18, that constitute a filter circuit, are soldered to a main substrate 20 and connected may be used. Smoothing capacitors 18 generally are configured to be housed in a case, and have a rectangular outer shape (rectangular parallelepiped shape) and a planar shape with a flat top surface as illustrated in FIG. 2. The high-voltage system components such as the smoothing capacitor 18 and the encased coil 17 (e.g., a common mode coil, normal mode coil, or the like) are connected to a high-voltage line on the main substrate 20 to configure a publicly known noise cancelling filter circuit.

The sub substrate 29 has a switching circuit 21 mounted thereon that is configured from a plurality of (six) switching elements (power elements) such as IGBT, and the like which converts DC power to three-phase AC power. To cool the power elements, which are heat-generating parts, the sub substrate 19 is disposed in contact with the pedestal face 9 formed on the wall face of the motor housing 3, which is the bottom face of the inverter housing portion 8, so that the power elements are cooled using the pedestal face 9 as a heat sink.

A control circuit 22, which operates at a low voltage, such as a CPU, is mounted on the main substrate 20, which is to control operation of the inverter device 7 by control signals from an ECU installed in the vehicle. On the top face of the main substrate 20, a P-N terminal 24 for inputting high-voltage DC power from the high-voltage cable 12 via the connector 13 and a UVW terminal 25 to output three-phase AC power of a specified frequency that is returned from the DC power are provided.

The UVW terminal 25 is connected to a glass-sealed terminal 26 that is installed in the inverter housing portion 8 penetrating the motor housing 3 to apply three-phase AC power to the electric motor installed inside the motor housing 3 via the glass-sealed terminal 26.

Additionally, the high-voltage line is connected to the P-N terminal 24 by inserting a connector 13 that is provided on the cover 11 side corresponding to the P-N terminal 24. Not less than a certain amount of pushing force is required when inserting the connector 13, and the stress thereof is caused to the main substrate 20.

In the present embodiment, a rectangular shaped (rectangular parallelepiped) smoothing capacitor 18, which is one of the high-voltage system components, is placed on the rear surface side of the main substrate 20 corresponding to the position in which the P-N terminal 24 is disposed in order to bear the stress caused to the main substrate 20, whereby the above stress caused to the main substrate 20 is borne on the top face thereof (support portion), which is opposite surface thereof. The smoothing capacitor 18 is electrically and mechanically connected to the main substrate 20, and is supported by the bottom surface of the inverter housing portion 8 in a state secured by means of adhesive, whereby the above stress can be sufficiently supported.

By thus placing the smoothing capacitor 18, which is one of the electrical components that constitute the inverter device 7, at the position on the opposite side of the P-N terminal 24 provided on the main substrate 20 to sandwich the main substrate 20 therebetween, it is possible, even though stress is caused to the main substrate 20 by excessive pressing force when inserting the connector 13 into the P-N terminal 24, for the stress to be borne by employing existing electrical components.

Thus, according to the present embodiment, providing a P-N terminal 24 that inputs high-voltage DC power on the main substrate 20 of the inverter device 17 and inserting a connector 13 provided to one end thereof to the P-N terminal 24 make it possible to connect a power source cable (high-voltage cable 12). Also, by placing the smoothing capacitor 18, which is one of the electrical components that constitute the inverter device 7, on the opposite side of the P-N terminal 24 to sandwich the main substrate 20 therebetween, the stress caused to the main substrate 20 when inserting the connector 13 is borne by the smoothing capacitor 18.

Therefore, the stress caused to the main substrate 20 when inserting the connector 13 can be reduced by being borne by the smoothing capacitor 18, which is one of the electrical components placed on the opposite side of the P-N terminal 24 to sandwich the main substrate 20 therebetween, even when a direct power source cable is directly connected by inserting the connector 13 provided to one end of the power source cable (high-voltage cable 12) into the P-N terminal 24 provided on the main substrate 20.

Consequently, the damage to the main substrate 20 and the mounting components due to the stress by the excessive pressing force caused when inserting the connector 13 can reliably eliminated. Additionally, omitting a terminal block or busbar provided in the DC power input system to reduce the number of components in the inverter device 7 can simplify the configuration, reduce cost, and reduce size and weight. Furthermore, reducing the number of the connections made via busbar can reduce the number of fabrication steps and improve reliability.

Additionally, the connector 13 provided to one end of the power source cable, i.e., high-voltage cable 12, is provided at a position corresponding to the P-N terminal 24 on the side of the cover 11 that seals the inverter housing portion 8, whereby it can be inserted into the P-N terminal 24 when the cover 11 is installed. Therefore, after the inverter device 7 has been housed and installed, the high-voltage cable 12 on the power source side can be connected to the P-N terminal 24 in the inverter device 7 by inserting the connector 13 disposed on the inner face of the cover 11 into the P-N terminal 24 at the same time as when the cover 11 is installed to seal the inverter housing portion 8.

Thus, the connection structure of the power source cable (high-voltage cable 12) can be simplified and the connecting process therefor can be simplified. Additionally, the connector 13 can be reliably inserted into the P-N terminal 24 without causing excessive stress to the main substrate 20, even if the connector 13 is engaged by pressing the cover 11 with a certain degree of excess force.

Also, in the present embodiment, the top surface facing the main substrate 20 of one of the electrical components (smoothing capacitor 18) provided on the opposite side of the P-N terminal 24 to sandwich the main substrate 20 therebetween, is employed as a support portion, and placed on the rear surface side of the main substrate 20 corresponding to the position in which the P-N terminal 24 is disposed. Therefore, stress caused to the main substrate 20 when inserting the connector 13 into the P-N terminal 24 is distributed and borne by the facing top surface of the electrical component (smoothing capacitor 18) that is placed on the rear surface side thereof. Thus, stress caused to the main substrate 20 can be vastly reduced and damage to the main substrate 20 or damage to the mounting components can be reliably prevented.

Furthermore, smoothing capacitors 18, which constitute a noise canceling filter circuit provided in the high-voltage DC power line of the inverter device 7, may be used as the above electrical components. Since the smoothing capacitors 18 are generally housed in the case and have a rectangular outside shape, they can be utilized as they are as the electrical components that bear the stress caused directly to the main substrate 20 by being placed on the opposite side of the P-N terminal 24 to sandwich the main substrate 20 therebetween. Consequently, by devising the disposition of existing electrical components to effectively use them as members to bear stress caused to the main substrate 20, it becomes possible to employ a configuration in which the power source cable is directly connected to the P-N terminal 24 on the main substrate 20, which can reduce the number of components in the inverter device 7, reduce costs, and reduce size and weight.

The present invention is not limited to the invention according to the embodiment as described above, and changes can be made as appropriate without departing from the gist thereof. For example, an example is described in the above embodiment in which smoothing capacitors 18 are used as the electrical components that are placed on the opposite side of the P-N terminal 24 to sandwich the main substrate 20 therebetween, but not limited to this, high-voltage system components, such as encased coils 17, such as the common mode coils or normal mode coils that are housed in a case, or other electrical components or cases, and the like, may be also used.

Additionally, a power source cable was described in which a high-voltage cable 12 was disposed inside a cover 11, and connected to a power source cable, but this could of course also be configured from a single cable. Furthermore, the inverter device 7 may have any configuration as long as it is configured so that a P-N terminal 24 is provided on a main substrate 20 and connected to a power source cable. For example, the inverter device 7 may be configured as an integrated unit by means of a resin structure, and then incorporated into the inverter housing portion 8.

REFERENCE SIGNS LIST

1 Inverter-integrated electric compressor
2 Housing
3 Motor housing
7 Inverter device
8 Inverter housing portion
11 Cover
12 High-voltage cable (power source cable)
13 Connector
18 Smoothing capacitor (electrical components)
20 Main substrate
24 P-N terminal

The invention claimed is:

1. An inverter-integrated electric compressor comprising:
an inverter device integrally incorporated into an inverter housing portion provided in an outer periphery of a housing,
a P-N terminal for inputting high-voltage DC power being provided on a main substrate of the inverter device, and a power source cable being able to be connected by inserting a connector provided to one end of the P-N terminal into the P-N terminal, and
electrical components that constitute the inverter device being placed on an opposite side of the P-N terminal to sandwich the main substrate therebetween, and the stress caused to the main substrate upon the connector being inserted is borne by the electrical components.

2. The inverter-integrated electric compressor according to claim 1, wherein the connector provided to one end of the power source cable is provided at a position corresponding to the P-N terminal on a cover side that seals the inverter housing portion so as to be inserted into the P-N terminal upon the cover being installed.

3. The inverter-integrated electric compressor according to claim 1, wherein the electrical components include a support portion on an opposite surface side of the main substrate that supports the main substrate, and are placed on a rear surface side of the main substrate corresponding to the position at which the P-N terminal is disposed.

4. The inverter-integrated electric compressor according to claim 1, wherein the electrical components are smoothing capacitors that constitute a noise cancelling filter circuit provided in a high-voltage DC power line of the inverter device.

5. The inverter-integrated electric compressor according to claim 2, wherein the electrical components include a support portion on an opposite surface side of the main substrate that supports the main substrate, and are placed on a rear surface side of the main substrate corresponding to the position at which the P-N terminal is disposed.

6. The inverter-integrated electric compressor according to claim 2, wherein the electrical components are smoothing capacitors that constitute a noise cancelling filter circuit provided in a high-voltage DC power line of the inverter device.

7. The inverter-integrated electric compressor according to claim 3, wherein the electrical components are smoothing capacitors that constitute a noise cancelling filter circuit provided in a high-voltage DC power line of the inverter device.

\* \* \* \* \*